(12) United States Patent
Franklin

(10) Patent No.: US 9,877,138 B1
(45) Date of Patent: Jan. 23, 2018

(54) METHOD AND SYSTEM FOR LOCALIZED DATA RETRIEVAL

(71) Applicant: Warren Lee Franklin, Salem, OR (US)

(72) Inventor: Warren Lee Franklin, Salem, OR (US)

(*) Notice: Subject to any disclaimer, the term of this patent is extended or adjusted under 35 U.S.C. 154(b) by 0 days.

(21) Appl. No.: 15/417,623

(22) Filed: Jan. 27, 2017

(51) Int. Cl.
| | | |
|---|---|---|
| *H04W 76/00* | (2009.01) | |
| *H04W 4/00* | (2009.01) | |
| *H04W 76/02* | (2009.01) | |
| *H04M 1/725* | (2006.01) | |
| *H04W 84/12* | (2009.01) | |

(52) U.S. Cl.
CPC ....... *H04W 4/003* (2013.01); *H04M 1/72563* (2013.01); *H04W 4/008* (2013.01); *H04W 76/021* (2013.01); *H04W 84/12* (2013.01)

(58) Field of Classification Search
CPC ... H04W 4/02; H04W 4/025; G06F 17/30241; G01C 21/20
USPC ........................... 455/456.1–456.3, 41.1–41.3
See application file for complete search history.

(56) References Cited

U.S. PATENT DOCUMENTS

| | | | |
|---|---|---|---|
| 2009/0319182 A1* | 12/2009 | Monteverde | G01C 21/20 701/533 |
| 2014/0280450 A1* | 9/2014 | Luna | H04W 4/008 709/202 |
| 2016/0044460 A1* | 2/2016 | Cornaby | H04W 4/023 455/456.3 |

\* cited by examiner

*Primary Examiner* — Ping Hsieh
(74) *Attorney, Agent, or Firm* — Mark S Hubert

(57) ABSTRACT

A system and method for localized data retrieval to disseminate data about points of interest at a display venue, based on a local area network established with a series of commonly named wireless access points operatively connected to a main router. The system is connected to a user's mobile device through an application they are directed to download. Each WAP has a common name and is located about the display venue in close enough proximity to other WAPs so as to constitute an uninterrupted communication platform with the main LDRS computer from which data about the points of interest is polled. Interspersed about the display venue is a series of tracking devices causing nearby mobile devices to self report their location to the LDRS computer.

7 Claims, 8 Drawing Sheets

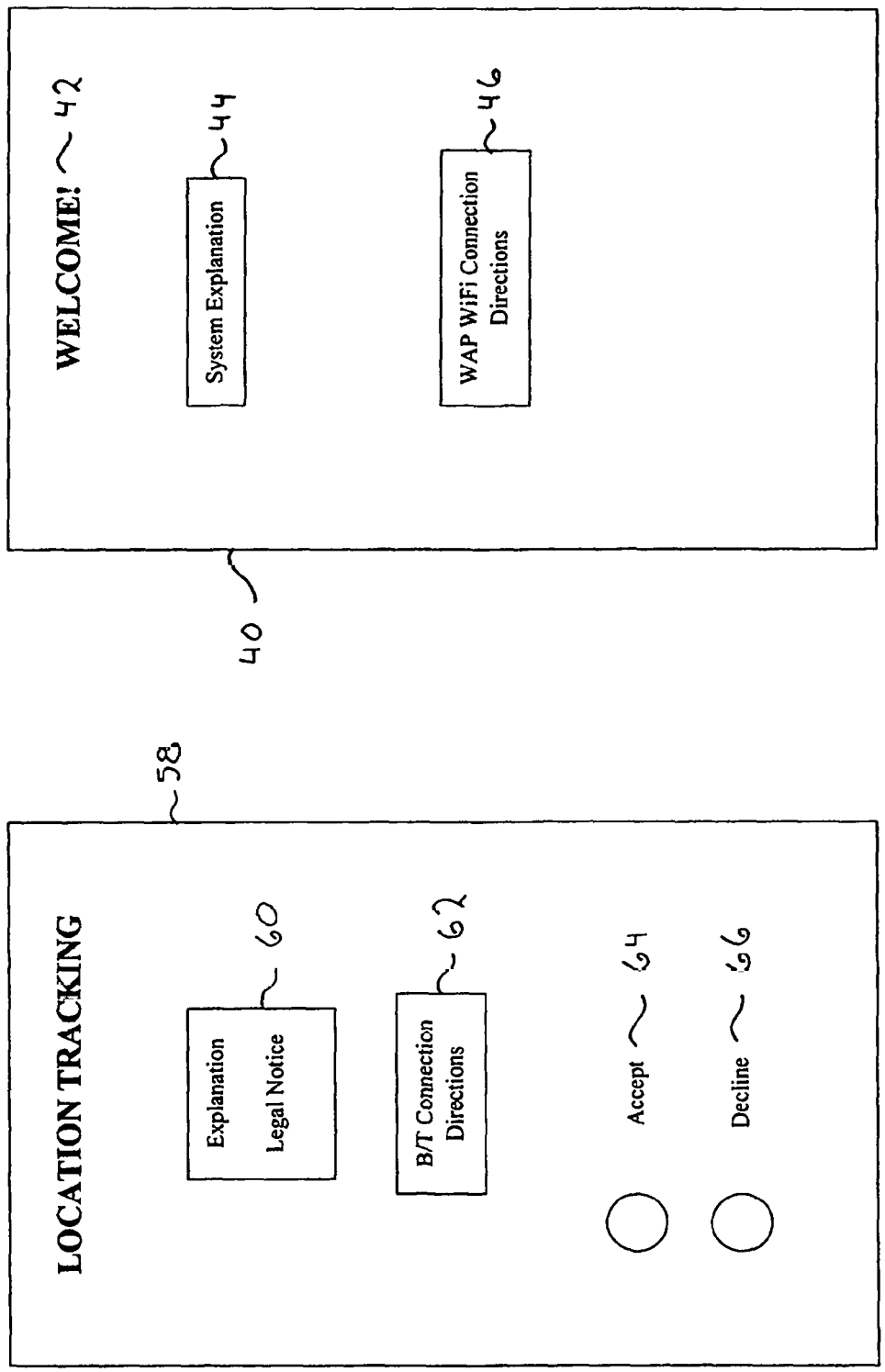

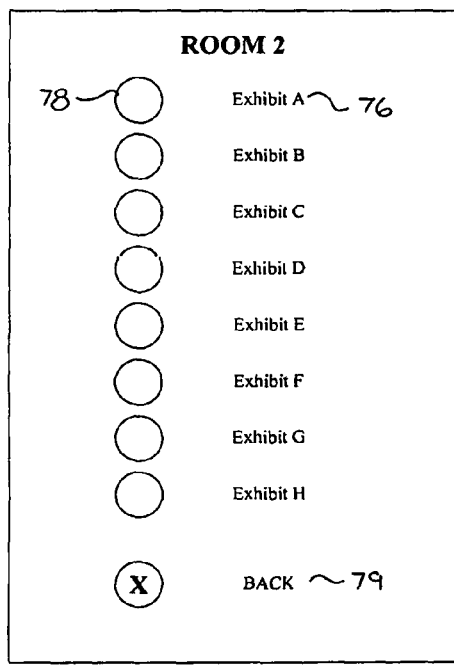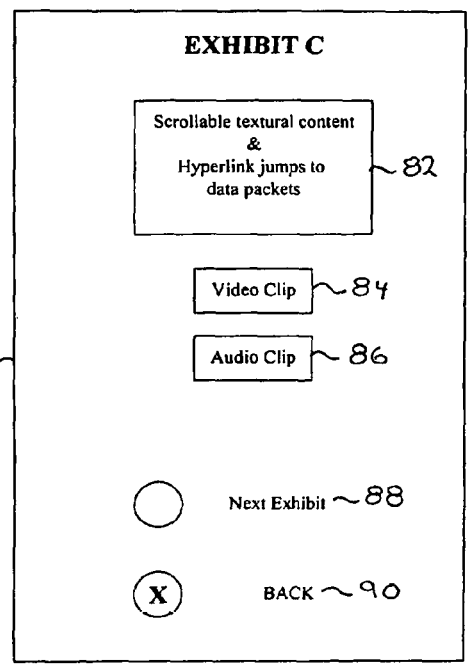
FIG 10
FIG 11

METHOD AND SYSTEM FOR LOCALIZED DATA RETRIEVAL

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method and apparatus for the dissemination of data for the public (relating to exhibits within a localized venue hence "localized data") that can be privately retrieved and viewed on a personal mobile device such as a smartphone.

BACKGROUND

Museums, national monuments, art galleries, exhibits, cemeteries, gardens, historic sites and other public viewing venues have the common goal of disseminating information to the public. Generally, there is only a certain amount of information that gets disseminated as this is commonly only what is displaced adjacent the point of interest. This information is frequently supplemented by brochures, reader boards, recorded or guided walking tours. The problem with this system is that the public is forced to listen to information that may not interest them and yet at the same time be deprived of more in-depth information about those points of interest that captive them.

There have been systems developed that utilize RFID chips located at each point of interest that when scanned by the appropriate device, will allow the user to access the limited amount of data stored on the chip (typically only two kilobytes worth) or directly visit a website via a link that is provided by the chip. This website (accessed by the users personal portable computing device such as a smartphone) would then contain a plethora of sortable data about that point of interest. However, there are few hand held portable computing devices that can read RFID chips without additional expensive, cumbersome equipment, and a close proximity to the RFID chips must be attained, nominally less than seven feet for passive RFID chips. Since cell service may not always be available, may be expensive or may be subject to a weakened signal the point of interest, this system is not always a viable option.

Other common alternatives to the RFID chips are RuBee™ which is a two way active wireless protocol for the transfer of data, and Memory Spot™ which is a passive RFID transponder. Neither of these can be utilized without a special reader, not found on any portable computing devices. Near Field Communication (NFC) devices such as a Bluetooth Beacon™ do allow a standard smart phone to read its broadcast data, but problems arise when the distance between similar nearby devices is short, thus eliminating their use where the points of interest are close. The use of a Global Positioning System (GPS) in conjunction with other data transmission means such as Infrared (IR), Free Space Optical Communication (lasers) also has its own problems.

Henceforth, an improved method and apparatus for localized data retrieval for selected points of interest that can operate on a smart phone or portable computing device, and that can easily differentiate between data streams related to adjacent, close points of interest, and that can be economically constructed, maintained and set up, would fulfill a long felt need in the fields of knowledge/data dissemination to the public. This new system utilizes and combines known and new technologies in a unique and novel configuration to overcome the aforementioned problems and accomplish this.

BRIEF SUMMARY

In accordance with various embodiments, a system, apparatus, and method for user selected data retrieval from a grouping of nearby points of interest, each with their own discrete data packets is provided.

In one aspect, a system of wireless communication devices configured to share large packets of selectable data to a smartphone or portable computing device with wireless capability so as to disseminate data related to the immediate surroundings.

In another aspect, an inexpensive self contained system of data that can be transmitted wirelessly to multiple nearby receiving devices contemporaneously using small, hidden, data transmission units.

In yet another aspect, an inexpensive self contained system of data for wireless transmission, that can be easily programed and quickly set up in a public environment that has a physical format with a small physical presence and that minimizes the possibility of theft or damage.

In yet another aspect, a self-contained interactive wireless communication system keyed to dissemination of information about points of interest within a localized area.

In a final aspect, a for profit system of retrieval of user selectable wireless data designated for public sharing where the data has been obtained from public uploads and put into data storage for the selected access of allowed viewers on their smartphone or portable computing devices, with wireless capability.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments of the localized data retrieval system (LDRS) may be realized by reference to the remaining portions of the specification and the drawings, in which like reference numerals are used to refer to similar components.

FIG. 6 is a representative view of the display interface of a user's MD showing a sample LDRS application landing page;

FIG. 8 is a representative view of the display interface of a user's MD showing a sample tracking page;

FIG. 10 is a representative view of the display interface of a user's MD showing a sample exhibit selection page; and FIG. 11 is a representative view of the display interface of a user's MD showing a sample exhibit data package page.

DETAILED DESCRIPTION OF CERTAIN EMBODIMENTS

Figure 1:
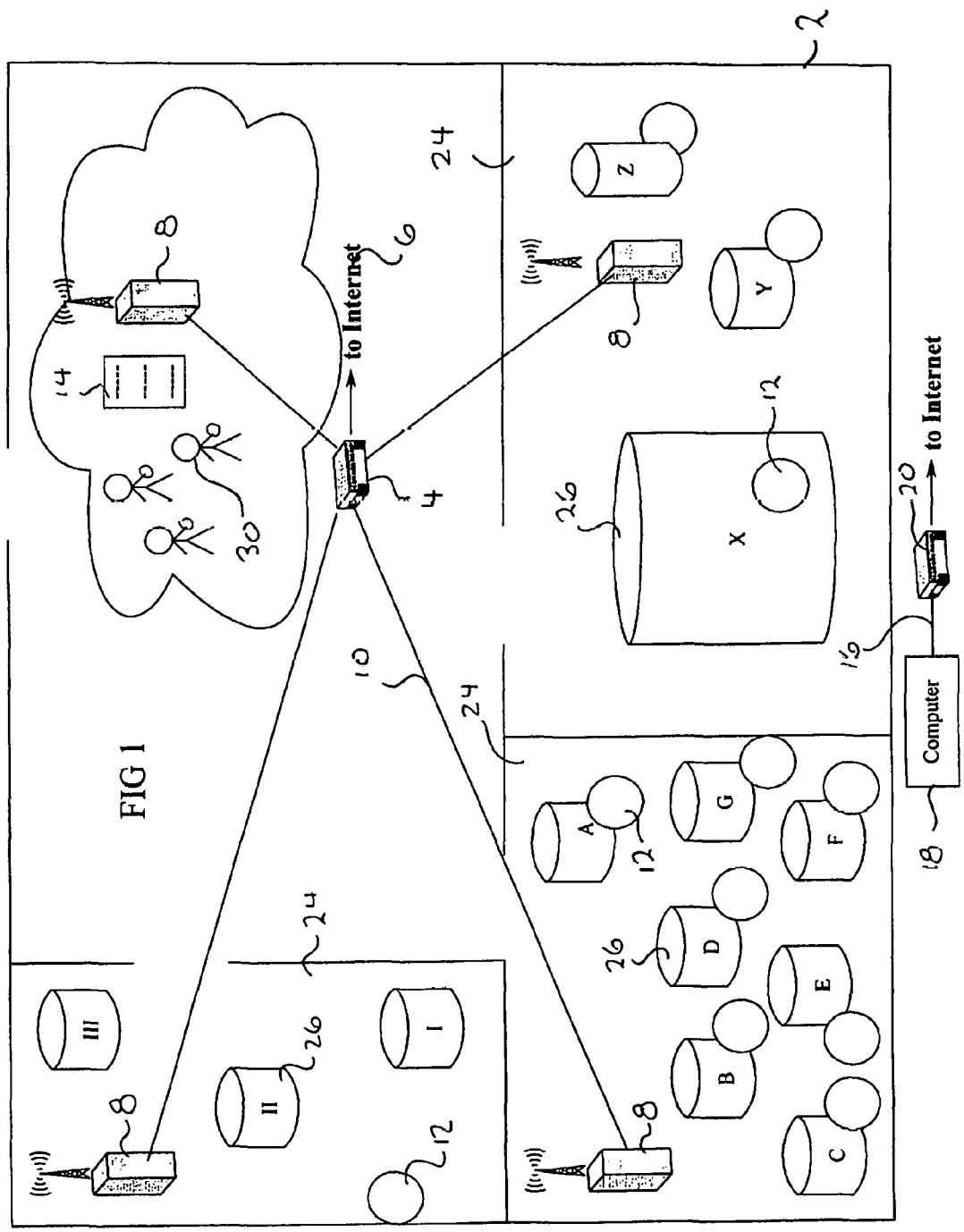
FIG. 1 is a representative drawing of the LDRS at the engagement step.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. Certain structures and devices may be shown in block diagram form. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "mobile device (MD)" refers to a device that is both portable and capable of collecting, storing, transmitting or processing electronic data or images. Examples include laptops or tablet PCs, personal digital assistants (PDAs), and "mobile smart" phones. This definition also includes storage media, such as USB hard drives or memory sticks, SD or CompactFlash cards, and any peripherals connected to the device.

As used herein, the term "cell phone" means any web-enabled mobile phone. While the term "smartphone" is well known in the art, smartphones typically include a touch sensitive screen, a messaging client, global positioning systems (GPS) technology or any other geo-position mechanisms to determine the physical coordinates of the smartphone, and a browser application. The browser application employs any web-based language such as JavaScript Object Notation (JSON), JavaScript, HyperText Markup Language (HTML), or any other web-based programming language capable of sending and displaying messages, search queries, and search query results. A mobile smartphone is an example of a MD.

As used herein, the term "display venue" refers to a physical location such as a museum, cemetery, art gallery, display hall, mall, sports field or the like, hosting a points of interest to be visited and seen by people.

As used herein, the term "localized" with respect to data refers to data sets or packages pertaining to exhibits contained within a localized area sucj as the venue of a museum, auto show or the like.

As used herein, the term "wireless access point (WAP)" refers to a networking hardware device that allows a Wi-Fi compliant device to connect to a network (wired or not). The WAP usually connects to a router (via a wired network) as a standalone device, but it can also be an integral component of the router itself. The WAP connection to a router may be wireless or wired.

As used herein, the term "local area network (LAN)" refers to a group of computers and associated devices that are independently connected to, or share a common two-way communications line or wireless link. The purpose is to share resources. They may or may not be interconnected so as to have the capability to share data between themselves. (Generally via Ethernet or Wi-Fi) Typically, a LAN encompasses computers, WAPs and associated or equivalent peripherals connected within a distinct geographic area such as an office or a commercial establishment. If the LAN is not hard wired and is wireless is ti called a WLAN.)

As used herein the term "WiFi" refers to a technology that allows electronic devices to connect to a wireless LAN (WLAN), mainly using the 2.4 gigahertz (12 cm) UHF and 5 gigahertz (6 cm) SHF ISM radio bandsvbased on the Institute of Electrical and Electronics Engineers' (IEEE) 802.11 standards.

As used herein the term "Bluetooth or B/T" refers to a wireless technology standard for exchanging data over short distances (using short-wavelength UHF radio waves in the ISM band from 2.4 to 2.485 GHz) from fixed and mobile devices, and building personal area networks (PANs).

As used herein the term "Bluetooth Beacon" refers to a class of Bluetooth low energy (LE) devices (hardware transmitters) that broadcast their identifier to nearby portable electronic devices. The technology enables smartphones, tablets and other devices to perform actions when in close proximity to a beacon. Here that action is to to detect other nearby BLE devices (such as your iPhone) and send a unique user ID (UUID) to the other device. Alternately, it may just continually broadcast its UUID. Generally, these are hockey puck-size devices and use batteries that can last a year or more. They can be affixed almost anywhere.

As used herein, the term "router" refers to a networking device that is connected (generally by hardwiring) to two or more data lines from different networks to forward data packets between computer networks. They perform the traffic directing functions on the Internet. Generally they forward data packets from one router to another router through the networks that constitute the internetwork until it reaches its destination node. The router reads the address information in the packet to determine the ultimate destination. Then, using information in its routing table or routing policy, it directs the packet to the next network on its journey. This creates an overlay internetwork. An example of a router would be a cable or DSL router, which connects to the Internet through an Internet service provider (ISP).

The term "cloud or cloud computing" as used herein refers to a type of Internet-based distributed computing that provides shared computer processing resources and data to computers and other devices on demand. It provides users with various capabilities to store and process their data in either privately owned, or third-party data centers that may be located anywhere. Cloud computing relies on sharing of resources to achieve coherence and economy of scale, similar to a utility (like the electricity grid) over an electricity network.

The present invention relates to a novel design for the localized dissemination of data packets within a specific area (such as a museum, arena cemetery etc.) to smart cell phones or other portable computing devices while optionally tracking the user's whereabouts throughout the specific area for reporting to user database. It constitutes a stand alone system and method of public data dissemination that is portable and configurable so as to be moved to different locations/venues. It is designed to be extremely small so it can be hidden in or near the exhibit rooms to deter theft or damage. It may be powered by wired electrical connection or by batteries with optional solar chargers.

Looking at FIG. 1 it can be seen that in its most basic embodiment the localized data retrieval system (LDRS) is made of a localized component and a remote component. The localized component is self-contained within a localized area 2 (display venue) such as a museum, arena, field, cemetery or the like. It consists of a local router 4 operatively connected to the internet 6, at least one wireless access point (WAP) 8 operatively connected to the router 4 (preferably by hardwiring 10 although alternate embodiments may use wireless communication), at least one wireless location tracking beacon 12 (preferably a Bluetooth beacon) strategically placed so as to be in wireless communication with a WAP 8, and a visual display 14.

The remote component of the LDRS is made of an connection 66 (hardwire) from the remote router 20 to the LDRS computer 18. (Although in the preferred embodiment this will be a hardwire connection, a wirelesss connection may be alternately used.) It also encompasses an internet connection to the application store hosting the LDRS software application available for downloading in the appropriate protocol (IOS, Android or equivalent commercially available alternatives) for that user's MD. The remote LDRS computer 18 has a series of relational databases and programs to distribute data packages as directed by the LDRS software application downloaded onto the users mobile devices (MD) 7. This distribution of data packages is two-way and includes the dissemination of data packages to the user's MD 7 as well as the dissemination of location/tracking data from the user's MD to the LDRS computer 18. (In a first alternative, the remote component of the LDRS may be an connection 16 from the remote router 20 cloud computing system.) it may be noted that in FIG. 1, the elements of the remote router, remote computer and hardwire connection are virtual as once the system is onto the internet it is directly tied to the cloud computing system.

The LDRS computer relational databases and programs to distribute data packages, (as directed by the LDRS software application downloaded onto the users mobile devices) are configurable by persons having ordinary skill in the art of developing software and relational databases. The LDRS software application that polls, extracts and presents the data packages onto the MD 7, is also configurable by persons having ordinary sill in the art of developing software applications for mobile devices. In simplest terms the LDRS computer stores the data packages in a retrievable database format and the MD retrieves the data packages based on tactile direction given by the user through the LDRS software application on their mobile device.

In a non preferred alternate embodiment, the LDRS system may not connect to the internet 6 but may directly be connected between the local router 4 and the LDRS computer which would also be located at the same localized area, however for economics, security and simplicity of operator access, the LDRS computer 18 preferably will be located offsite and accessed via the internet 6 and the connected remote router 20. The remote router 16, connection 18 and LDRS computer 20 are virtual components of a cloud computer system.

The software program that is downloaded from the appropriate application store to the user's MD, streams or downloads data packages tactilely selected from the user's MD (via a displayed option touchscreen) chosen from one of the displayed option touch screens the LDRS application provides, so as to present this data to the user. It also, upon receipt by the MD's Bluetooth transceiver of a wireless signal from any of the Bluetooth location tracking beacons 12 communicates this signal to the LDRS computer (via the WAP 8, the local router 4, the internet 6 and the remote router 20). The LDRS computer interprets the location associated with this beacon's signal from one of its relational databases, and stores this information from later retrieval by the operator.

Figure 4:
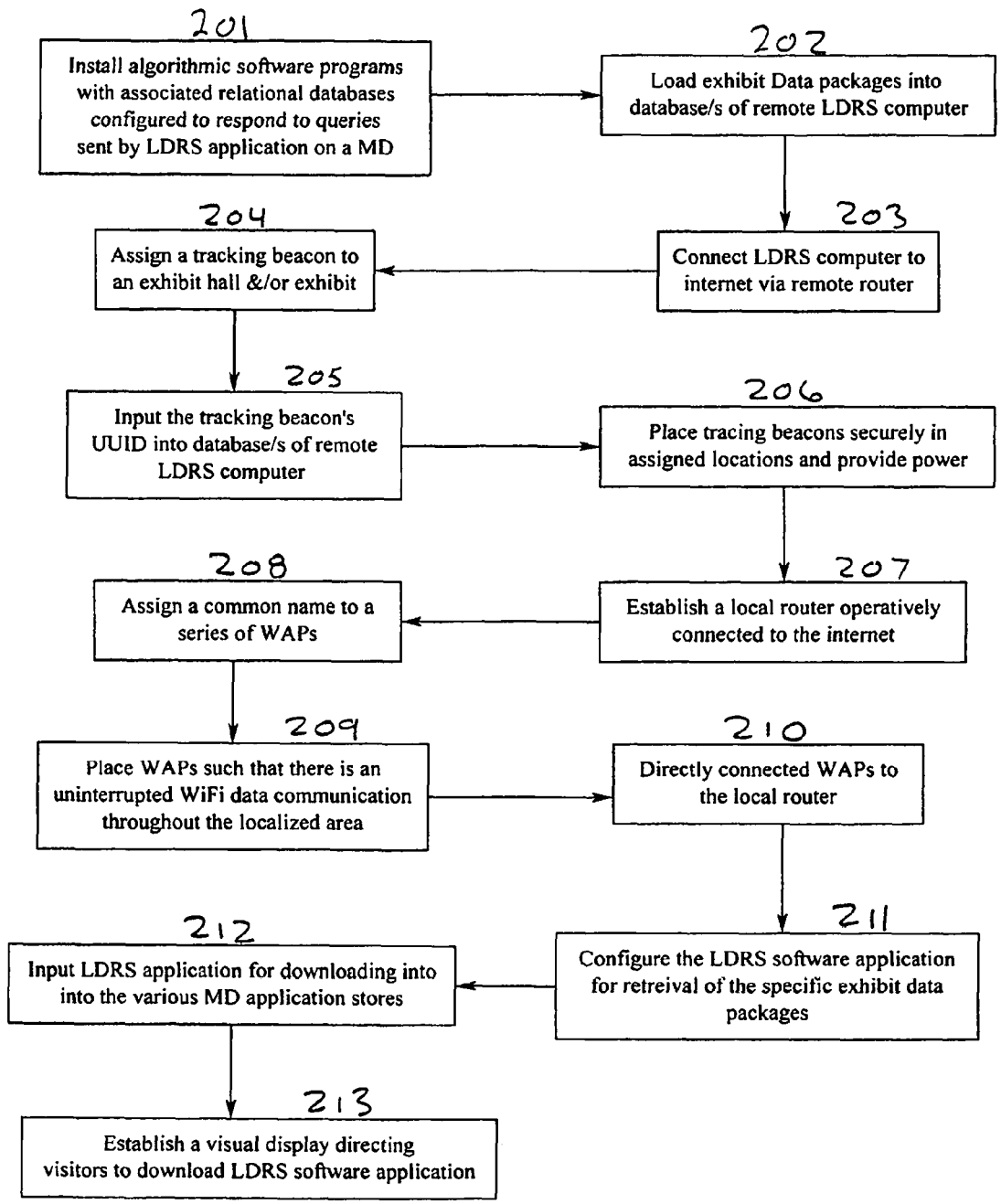
FIG. 4 is a flow chart of the steps for the establishment of a LDRS from the operator standpoint.
Figure 5:
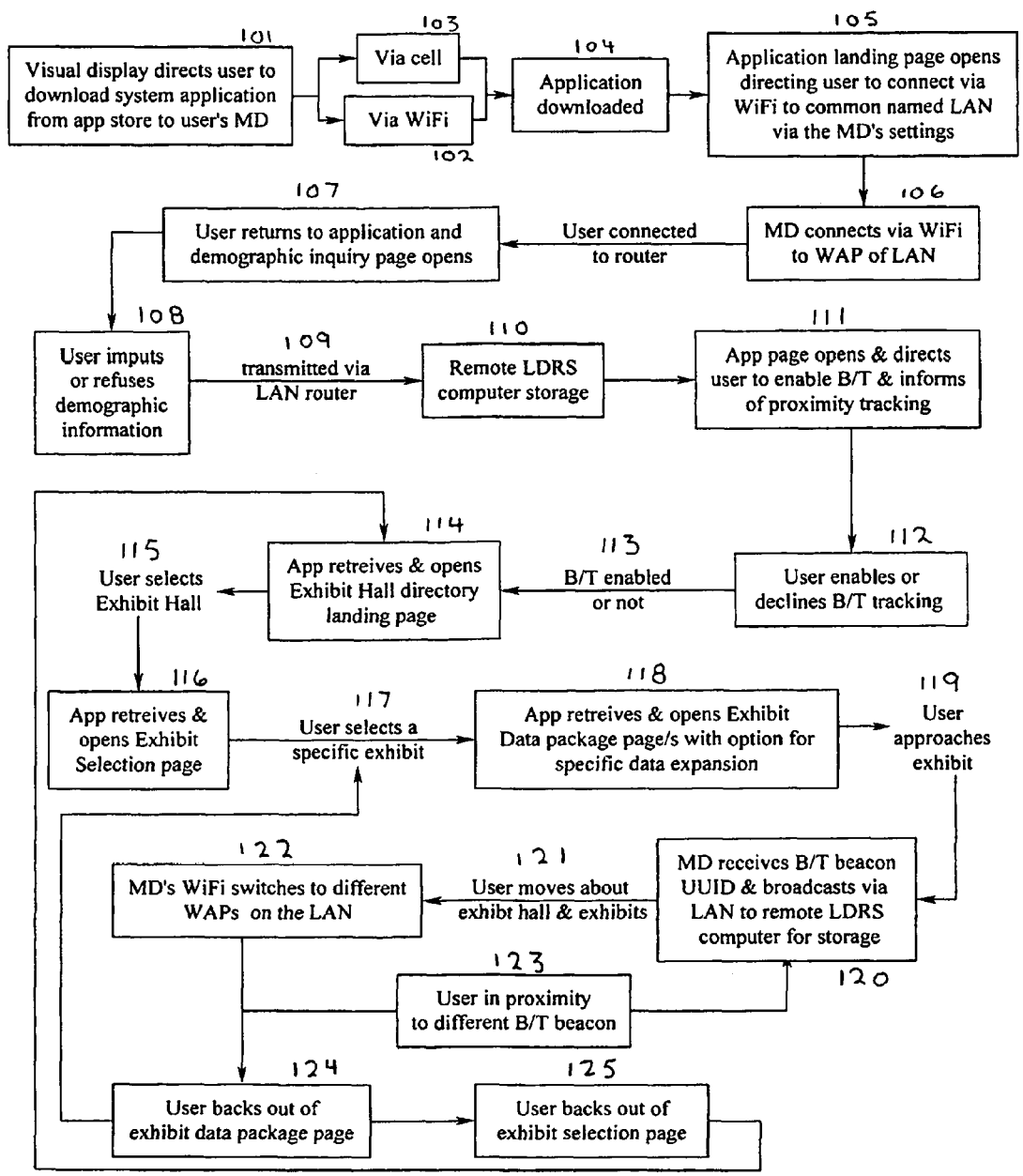
FIG. 5 is a flow charts of the operational steps of the LDRS from a user standpoint.

The LDRS is configured and setup in the following way from the operator's standpoint. (See FIG. 4) It will be discussed herein in the context of the localized area 2 being a museum with numerous rooms 24 (exhibit halls) each having numerous exhibits 26, although it is envisioned for use at cemeteries, art galleries, trade shows, public forums, and the like. In these situations the rooms may just be areas and the exhibits may just be areas adjacent an object to be viewed. The system will be discussed with the use of a LDRS computer 18 rather than a cloud computing system which will be considered a functional equivalent and alternative.

The LDRS software applications and relational databases are installed into the remote LDRS computer. 201 The LDRS computer has data packages corresponding to the various exhibits 26 loaded into one of its relation databases. 202 These data packages may have text, photos, video, sound. (Generally, these will be provided by the museum's personnel or from "pay-for-display" third party venders.) The exhibit data packages are organized from provided exhibit data and stored into relational databases. In the LDRS computer 18 is operationally configured a program that receives data packet requests from the LDRS software application running on the MD, and in response, is capable of transmitting data packages from one of its relational databases back to the MD. The program also is capable of storing location beacon UUID's sent by the software program of the MD in one of its databases for later retrieval. The operator establishes and uses a local router 4 in the localized area 2 that is operably connected to the internet 6 and connects it to the LDRS computer. 203. The operator assigns a tracking beacon 12 to an area, 204 be it a room 24 or adjacent an exhibit, and inputs its UUID and its assigned location to a relational database in the LDRS computer 205. (Optionally the UUID may be inputted into the LDRS software program.) The tracking beacons 12 are powered (generally by a battery or a battery connected to a solar panel) and placed at specific locations in a room 24 or adjacent an exhibit. 206 Generally, if only one tracing beacon 12 is to be used per room, that tracking beacon 12 will be placed in the approximate center of the room 24 and in a spot that is not visible or accessible by the public. Ceilings or stand/presentation enclosures in the exhibit rooms for the specific exhibits 14 are suitable locations. A local router operatively connected to the internet is established. 207 A series of WiFi WAPs 8 are assigned the identical name/identifier. 208 The WAPs are distributed throughout the localized area 2 such that there is uninterrupted data communication access from a compliant WiFi enabled MD to the local router 4 and the internet 6 from any point in the localized area 2 via a WAP. 209 The commonly named WAPs are connected (preferably by hardwire cables 10) to the local router 210. A visual display is established in the localized area 2 directing users to download the LDRS software application from their MD's application store. 211 Each LDRS system will be configured for a specific localized area and venue. 212 The LDRS software application will be integrated into the various MD's application stores for downloading into the MDs via WiFi or their cell carriers network. An operator with permission codes may access and retrieve the tracking beacon data as well as edit the data packages in the relational database.

The LDRS software application is downloadable from that MD's application store into the operating system of the MD. It is configured to communicate the UUID of any tracking beacon 12 signal transmitted to the MD to the LDRS, to display tactile interactive pages (from the LDRS computer 18 or the software application loaded into the MD) onto the MD's video display, to send data packet requests to the LDRS computer 18, and to receive into transient memory and present data packages in a visual/audio format on the MD's video display. Such a software application is not detailed herein as it is configurable by persons having ordinary skill in the art and the specifics of the coding is not relevant to this invention.

The LDRS works in the following way from a user's standpoint. (See FIGS. 1-4 and FIG. 5). The user enters the localized area 2. Visual display 14 directs user to download the LDRS application from their application store 101. This can be done via WiFi and the internet 102 (from an open WiFi) or via cellular communication 103. User downloads LDRS application and opens it. 104 The LDRS application landing page open on the user's MD and directs user to connect their MD to the commonly named WAP's WiFi network (WLAN 5) through their MD's settings. 105 User connects their MD to the WLAN. (At this point the MD is also connected to the local router 4 via the nearest WAP.) 107 The user returns to the LDRS application which displays a demographic inquiry page requesting the user to input and send demographic data or refuse (see FIG. 6). 107 (At this point, alternatively a WLAN captive portal page may open on the MD to the demographic inquiry page.) If user participates and inputs data via tactile input, 108 the demographic data is sent from the MD to the LDRS computer 109 and is stored there 110. Upon tactile transmission of demographic data or refusal on user's MD, the LDRS application opens a tracking page presenting the user of the option of implementing a tracking function upon enablement of their MD's Bluetooth communication function. (See FIG. 7) 111 User acknowledges and accepts or declines Bluetooth communication. 112 User enables the Bluetooth capability on their MD from the MD's settings or not. 113 LDRS application queries the LDRS computer and retreives a museum exhibit hall directory page which the LDRS application displays on the user's MD (See FIG. 8). 114 The user performs tactile selection of an exhibit hall on the MD. 115 The LDRS application queries the LDRS computer and retreives a specific exhibit selection page which the LDRS application displays on the user's MD (See FIG. 10). 116 The user performs tactile selection of an exhibit on the MD. 117 The LDRS application queries the LDRS computer and retreives a specific exhibit data package page which the LDRS application displays on the user's MD (See FIG. 11). 118 Each specific exhibit data package page may present tactile selectable options to display more data, video or audio files. (Data expansion) User walks into the exhibit hall and into the proximity of the specific exhibit 119 and MD receives a UUID signal from the Bluetooth tracking beacon which the LDRS transmits to the WAP and the LDRS computer for storage. 120 The user moves about the museum. 121 while his MD retains connection to the WLAN by switching its WiFi connection to the closest or strongest signal WAP 122. When the MD is in close enough proximity to receive the Bluetooth beacon's UUID signal, tracking data will be provided to the LDRS computer 123 and 120. There is a uninterrupted communication of data maintained between the LDRS computer and the MD because of the WAP hopping of the MD between the commonly named WAPs on the LAN. The user continues to move about the localized area 2 selecting the "BACK" option on the exhibit data package page 124 prompting the LDRS application to query the LDRS computer and receive an exhibit selection page which the LDRS application displays on the user's MD display 117 and from where the user may select another exhibit data package page. Selecting the "BACK" option on an exhibit selection page 125 prompts the LDRS application to again query the LDRS computer and receive the museum exhibit hall directory page 114 which the LDRS application displays on the user's MD and from where the user may select another exhibit hall. After the user has seen the museum and viewed the specific data packages corresponding to the specific exhibits, they close the LDRS application or turn off their MD.

It is expected that this service will be provided at a price paid by the museum, paid by revenues generated by the fees from downloading the LDRS application from the MD's application store; or from fees received from third party advertisers allowed to place their adds into the specific exhibit data packages in the LDRS computer.

Looking at FIG. 1 the basic operation and advantages of the LDRS can best be seen. Visitors 30 enter the localized area 2 (normally into entry or foyer area) that has WiFi communication capability via a nearby WAP 8. From the entry point they can see the visual display 14. This directs them how to get and enable the LDRS application for their mobile device (MD). The application directs them to connect their MD to a WLAN via a commonly named WAP 8. They navigate through a demographic enquiry and may accept or opt out for location tracking. Upon completion, the LDRS application provides an interactive, tactile interface on the visitor's MD, between the visitors 30 and the exhib-it's data packages.

Figure 2:
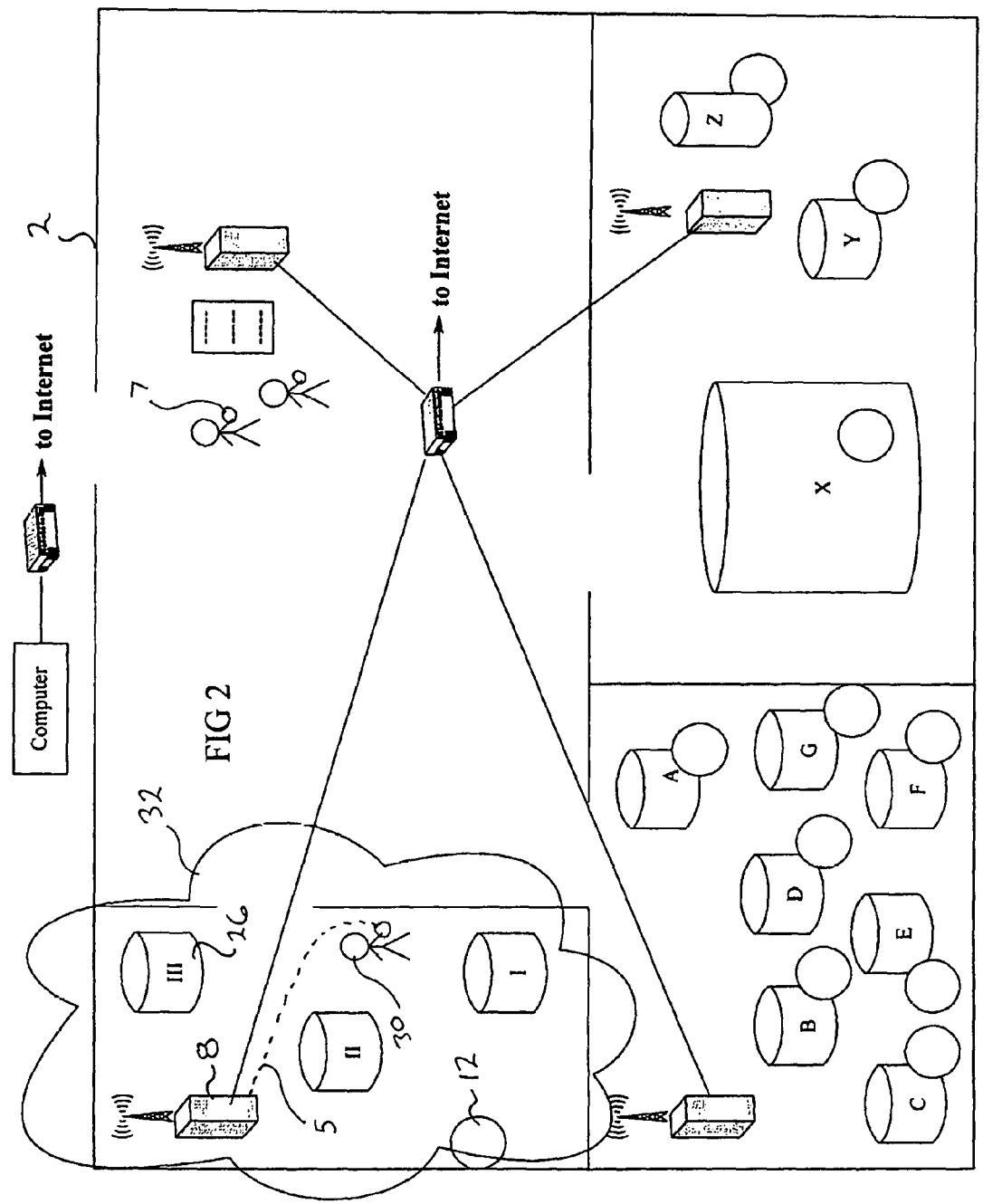
FIG. 2 is a is a representative drawing of the LDRS at the exhibit area entry step by a single user.

In FIG. 2 one of the visitors 30 has selected an exhibit room 26 to visit and left the foyer area, out of the communication range of the WAP located in the foyer but within the communication range of the WAP in that exhibit hall. They will have selected that exhibit hall from the LDRS application on their MD. This will have displayed a tactile selection of data packages corresponding to the exhibits 26 in that exhibit hall 24. They move about the exhibit hall selecting the data packages for the various exhibits 26 and selectively viewing the data packages. The data packages are expandable and may have video, audio, and textural components. As they move about the exhibit room 26 their MD enters into the range of a location tracking B/T beacon 12 causing their MD to self report its location. There may be one location tracking B/T beacon 12 per exhibit hall or there may be multiple B/T beacons adjacent the exhibits.

Figure 3:
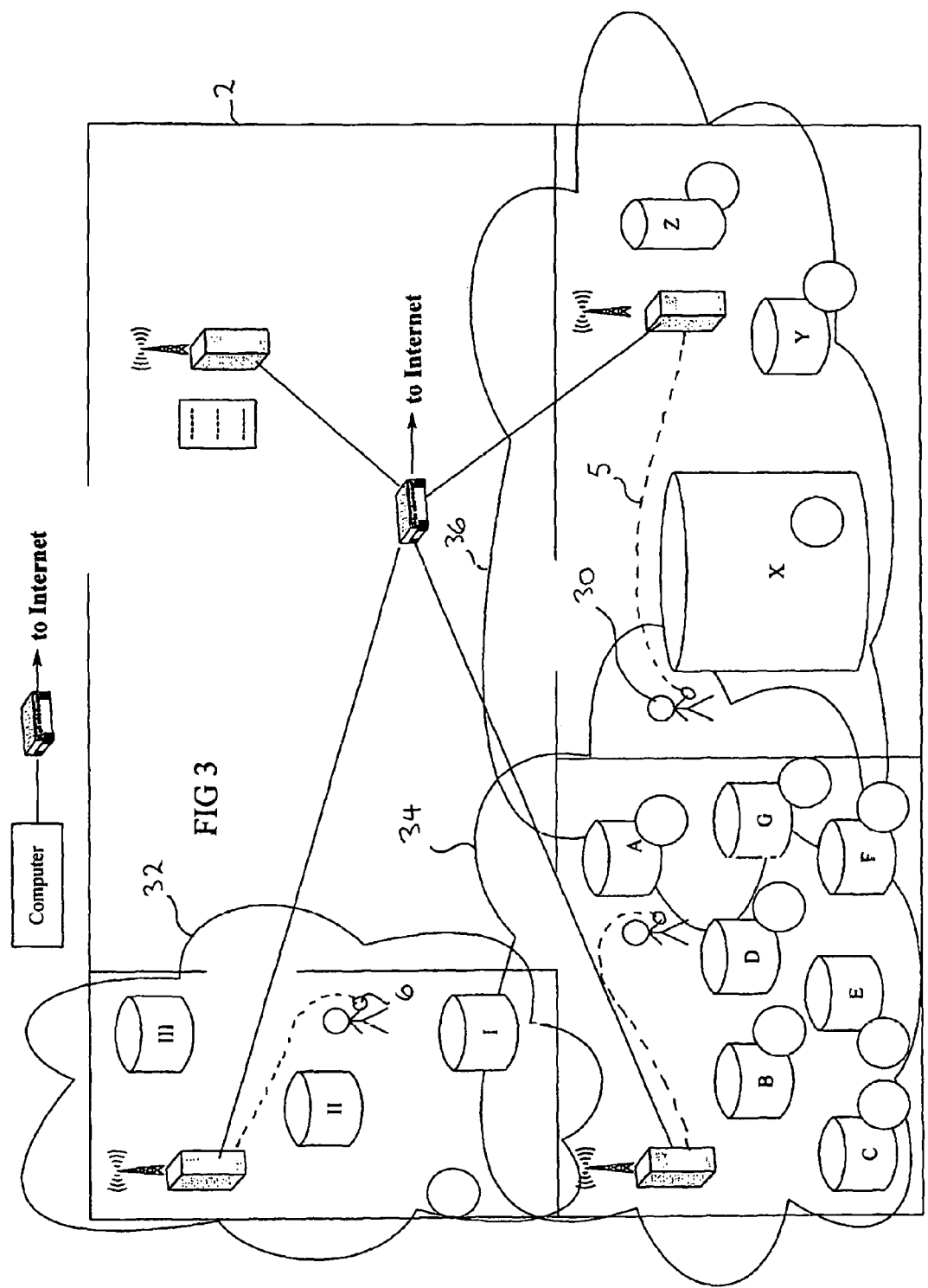
FIG. 3 is a is a representative drawing of the LDRS at the exhibit area entry step by multiple users.

In FIG. 3 each of the visitors 30 have visited different exhibit halls 24 and each remain connected to the same WLAN although it is through different WAPs. The WAP that the visitor is connected to need not be the one in the exhibit hall they are in. As can be seen, WAP communication range one 32 overlaps with WAP communication range two 34 which overlaps with WAP communication range three 36 so as to form an uninterrupted communication platform for the visitor's MD throughout the localized area 2. In this way the visitors can retrieve data about the exhibits as they wander about the localized area.

Looking at the sample LDRS application landing page 40 of FIG. 6, it can be seen that it contains an introductory salutation 42, a system explanation 44 and a prompt and set of directions for WiFi connection to the WLAN via one of the commonly named WAPs.

Figure 7:
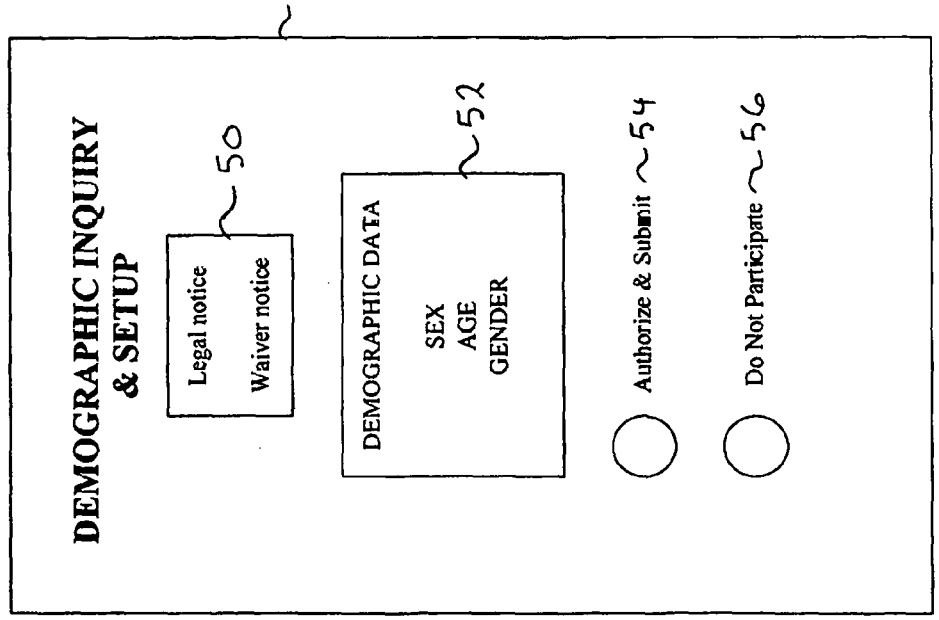
FIG. 7 is a representative view of the display interface of a user's MD showing a sample demographic inquiry page.

Looking at the sample demographic inquiry page 48 of FIG. 7, it can be seen that it presents textural legal notices 50; a demographic data tactile input region 52, a tactile authorization and electronic submission button 54, and a tactile demographic inquiry refusal button 56.

Looking at the sample tracking page of FIG. 8, it can be seen that it presents a textural explanation and legal notice 60, a prompt and directions for Bluetooth connection 62, a tactile acceptance button 64 and a tactile declination button 66.

Figure 9:
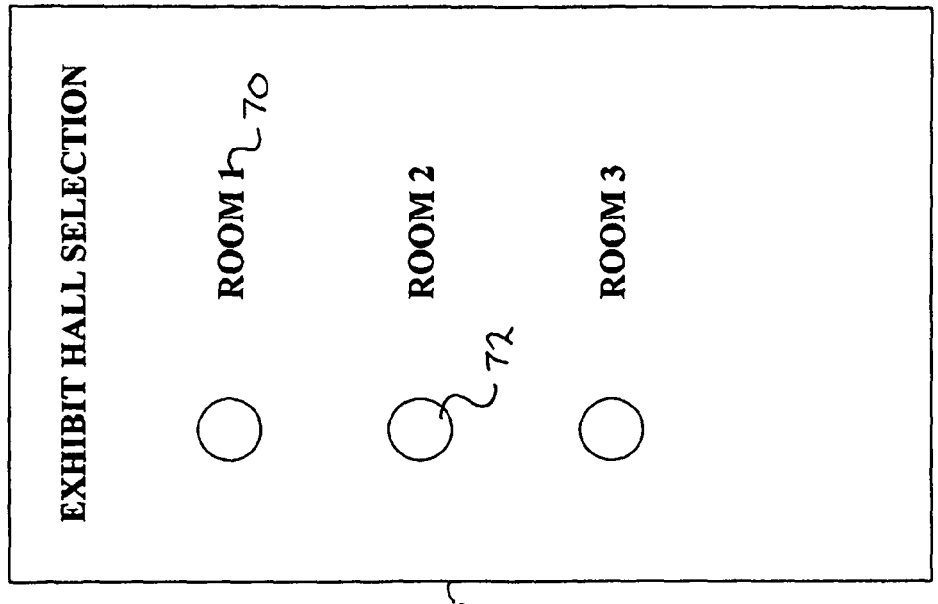
FIG. 9 is a representative view of the display interface of a user's MD showing a sample exhibit hall directory page.

Looking at the sample exhibit hall directory page 68 of FIG. 9, it can been seen that it presents a textural listing of the various exhibit halls (rooms) 70 with an adjacent tactile button for its selection 72.

Looking at the sample exhibit selection page 74 of FIG. 10, it can be seen that it presents a textural listing of the various exhibits 76 in the exhibit hall selected, an adjacent tactile button for its selection 78, and a tactile button 79 for the return to the exhibit hall directory page 68.

Looking at the sample exhibit data package page 80 of FIG. 11, it can be seen that it presents the data package corresponding to the exhibit selected. It may consist of scrollable textural content including hyperlinks 82, video clips 84 and audio clips 86. It optionally contains a tactile "Next Exhibit" button 88 that advances LDRS application to retrieve and display the next sequentially listed exhibit and a tactile button 90 for the return to the exhibit selection page 74.

The option of solar charges onto a battery powered unit allows the mounting of outdoor units on non accessible centrally located stands or poles for areas without power such as cemeteries or historical fields.

Broken down into its steps; the method of establishing a system for the uninterrupted retrieval and presentation of remote data onto a visitor's mobile device while said visitor moves about a display venue, are:

establishing a first internet connection through a first router to a computer;

installing software with at least one relational database into the computer, the software configured for the transmission of at least one data package from the computer to the mobile device upon a prompt from a software application on the mobile device to the computer;

loading venue related data into the computer in any combination of textural data, video data or audio data;

organizing venue related data into specific exhibit data packages in relational database for retrievable storage;

assigning at least one wireless tracking beacon with its own discrete UUID signal to a location in the display venue; where the wireless tracking beacon transmits the UUID signal in a Bluetooth wireless technology standard;

imputing the UUID from the UUID signal into a relational database in the computer associating the UUID with the assigned location in the display venue of its associated wireless tracking beacon.

establishing a second internet connection through a second router in the display venue; (the mobile device and said computer are operably connected for communication and transfer of data through the internet)

installing a WAP with a given name (with a first communication range) at a first location in the display venue, and operatively connecting it to the second router (preferably by hardwiring) so as to establish a WLAN with data communication access for a compliant WiFi enabled mobile device to the second router from any point in the first communication range;

assigning a name identical with a name given to the first WAP to at least a second WAP;

installing at least one additional commonly named WAP at a second location about the display venue, (with a second communication range), and operatively connecting it to the second router (preferably by hardwiring) wherein said first communication range and said second communication range overlap so as to provide a larger, uninterrupted communication range distributed throughout the display venue for a compliant WiFi enabled mobile device to connect to said second router.

making accessible into at least one mobile device application store, a downloadable software application for a mobile device, that is configured to prompt the computer for the transmission of data packages to the mobile device based on tactile section of options provided by on said mobile device and to prompt the mobile device to transmit any UUID signal received by a mobile device to the computer; and establishing a visual display in said display venue, said visual display providing direction for the downloading the data retrieval application onto the mobile device.

As can be seen, the LDRS offers a simple system to access and navigate data on the user's mobile device providing the user a variety of data content about points of interest in specific locations at a display venue. Tactile selection of options presented on the mobile device allows the user to navigate through the various data packages corresponding to the different points of interest.

This offers an inexpensive alternative to human guides and allows for a plethora of information to be disseminated to the public, enough to satisfy even the most curious of minds.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A method of establishing a system for the uninterrupted retrieval of remote venue related data packages that are tactilely selected on a data package retrieval application program loaded on a visitor's mobile device by the visitor for presentation onto the visitor's mobile device while said visitor moves about a display venue, said data packages associated with points of interest viewable at said display venue, consisting of the steps of:

establishing a first internet connection through a first router to a computer;

installing software with at least one relational database into said computer, said software configured for the transmission of at least one of said data packages from said computer to said mobile device upon a prompt from a data package retrieval application program on said mobile device to said computer;

loading a venue related data into said computer;

organizing said venue related data into said data packages in said relational database for retrievable storage;

establishing a second internet connection through a second router in the display venue; wherein said mobile device and said computer are operably connected for communication and transfer of data through said internet connections;

installing a series of commonly named wireless access points (WAPs) at a series of locations about said display venue, each of said WAPs having a communication range, said communication ranges overlapping so as to provide a larger, uninterrupted communication range distributed throughout said display venue, said WAPs operatively connected to said second router so as to establish a wireless local area network (WLAN) with data communication access for a compliant WiFi enabled mobile device to said second router from any point in said uninterrupted communication range;

making accessible into at least one mobile device application store, a downloadable data package retrieval application program for a mobile device, said data package application program configured to open a landing page on said visitor's mobile device that directs said visitor to connect their said mobile device to said WLAN via their mobile device's settings, and said data package application program also configured to prompt said computer for the transmission of said data packages from said computer to said mobile device based on tactile section of data package options provided by said data package retrieval application program on said mobile device;

establishing a visual display in said display venue, said visual display providing direction for the downloading of said data package retrieval application program onto said mobile device from said mobile device application store via cellular communication or the internet; and providing said visitor a tactile selectable option on said visitor's mobile device for sharing communication of proximity tracking data of said visitor's mobile device based on communication from a wireless tracking beacon within said display venue received by said visitor's mobile device and transmitted by visitor's said mobile device via said WLAN to said computer for storage and retrieval in a second relational database of said computer.

2. The method of establishing a system for the uninterrupted retrieval of venue related data packages of claim 1 further comprising the steps of:

assigning at least one wireless tracking beacon with its own discrete UUID signal to a location in the display venue; and imputing a UUID into said relational database in said computer associating said UUID signal with assigned said location in the display venue of its associated wireless tracking beacon.

3. The method of establishing a system for the uninterrupted retrieval of venue related data packages of claim 2 wherein said wireless tracking beacon transmits said UUID signal in a Bluetooth wireless technology standard.

4. The method of establishing a system for the uninterrupted retrieval of venue related data packages of claim 3 wherein said data package retrieval application program on said mobile device prompts said mobile device to transmit any of said UUID signal received by said mobile device to said computer if said tactile selectable option is elected.

5. The method of establishing a system for the uninterrupted retrieval of venue related data packages of claim 4 wherein said software loaded onto said computer is configured for storing said location beacon UUID's transmitted to said computer by said mobile device for later retrieval.

6. The method of establishing a system for the uninterrupted retrieval of venue related data packages of claim 2 wherein said data package is selected from at least one member of the group consisting of video data, textural data, and audio data.

7. The method of establishing a system for the uninterrupted retrieval and presentation of remote data of claim 6 further comprising the step of hardwire connecting said commonly named WAPs to said second router.

* * * * *